US008154445B2

(12) United States Patent
Maenpa et al.

(10) Patent No.: US 8,154,445 B2
(45) Date of Patent: Apr. 10, 2012

(54) SYSTEM AND METHOD FOR FREQUENCY DOMAIN CORRECTION OF GLOBAL NAVIGATION SATELLITE SYSTEM PSEUDORANCE MEASUREMENTS IN RECEIVERS HAVING CONTROLLED RECEPTION PATTERN ANTENNAS

(75) Inventors: Jon E. Maenpa, Redondo Beach, CA (US); Andrew M. Hautzik, Rancho Palos Verdes, CA (US); Richard G. Keegan, Palos Verdes Estates, CA (US)

(73) Assignee: Raytheon Company, Waltham, MA (US)

( * ) Notice: Subject to any disclaimer, the term of this patent is extended or adjusted under 35 U.S.C. 154(b) by 198 days.

(21) Appl. No.: 12/750,540

(22) Filed: Mar. 30, 2010

(65) Prior Publication Data

US 2011/0241939 A1    Oct. 6, 2011

(51) Int. Cl.
G01S 19/23    (2010.01)
G01S 19/30    (2010.01)
G01S 19/37    (2010.01)

(52) U.S. Cl. .......... 342/357.62; 342/357.69; 342/357.77
(58) Field of Classification Search ............. 342/357.62, 342/357.69, 357.77
See application file for complete search history.

(56) References Cited

U.S. PATENT DOCUMENTS

| | | |
|---|---|---|
| 5,410,321 A | 4/1995 | Gordon et al. |
| 5,694,416 A | 12/1997 | Johnson |
| 5,949,372 A | 9/1999 | Lennen |
| 5,955,987 A | 9/1999 | Murphy et al. |
| 6,049,307 A | 4/2000 | Lim |
| 6,266,007 B1 * | 7/2001 | Lennen .................... 342/357.62 |
| 6,469,667 B2 | 10/2002 | Fox et al. |
| 6,642,898 B2 | 11/2003 | Eason |
| 6,727,846 B1 | 4/2004 | Brown |
| 6,744,408 B1 | 6/2004 | Stockmaster |
| 6,828,935 B1 | 12/2004 | Dunn et al. |

(Continued)

FOREIGN PATENT DOCUMENTS

JP    03-234128 A    10/1991

OTHER PUBLICATIONS

Extended Search Report for European Application No. 11152542.4, Extended Search Report dated Jun. 29, 2011 and mailed Jul. 15, 2011 (7 pgs.).

(Continued)

Primary Examiner — Gregory C Issing
(74) Attorney, Agent, or Firm — Christie, Parker & Hale, LLP

(57) ABSTRACT

Global Navigation Satellite System (GNSS) pseudorange measurements must be compensated for receiver hardware and directionally dependent antenna errors to obtain desired accuracies for high precision GNSS positioning applications. The problem of pseudorange measurement errors resulting from directionally dependent group delays is not an issue in Fixed Reception Pattern Antenna (FRPA) GNSS sensors. However, for the complex case of a GNSS receiver employing a controlled reception pattern antenna (CRPA) and dynamic beam steering, the multiplicity of combinations of antenna element outputs makes compensation of directionally dependent antenna induced errors more difficult, as the simple subtraction that might be used for FRPA compensation does not work with a CRPA. Example embodiments provide for frequency domain correction of GNSS pseudorange measurements in CRPA receivers. The correction takes place in the signal processing of the satellite signals, after they have been converted to the frequency domain, but before they are formed into beams for the respective satellites.

11 Claims, 5 Drawing Sheets

U.S. PATENT DOCUMENTS

| | | | |
|---|---|---|---|
| 6,847,328 | B1 | 1/2005 | Libonati et al. |
| 6,965,816 | B2 | 11/2005 | Walker |
| 6,992,643 | B2 | 1/2006 | Fox et al. |
| 6,999,027 | B1 | 2/2006 | Stockmaster |
| 7,015,858 | B2 | 3/2006 | Fuchser et al. |
| 7,106,249 | B2 | 9/2006 | Kubo et al. |
| 7,161,528 | B2 | 1/2007 | Kirby et al. |
| 7,181,247 | B1 | 2/2007 | Melick et al. |
| 7,212,921 | B2 | 5/2007 | Jeerage et |
| 7,304,605 | B2 | 12/2007 | Wells |
| 7,324,064 | B2 | 1/2008 | Fox et al. |
| 7,336,736 | B2 | 2/2008 | Leblond et al. |
| 7,340,283 | B1 | 3/2008 | Melick et al. |
| 7,382,313 | B1 | 6/2008 | Goad |
| 7,440,988 | B2 | 10/2008 | Grobert |
| 7,525,482 | B1 * | 4/2009 | Lackey et al. ............ 342/368 |
| 7,859,454 | B2 * | 12/2010 | Abraham ............ 342/357.62 |
| 8,044,857 | B2 * | 10/2011 | Maenpa et al. ............ 342/368 |
| 2005/0159891 | A1 | 7/2005 | Cohen et al. |
| 2009/0066574 | A1 | 3/2009 | De Lorenzo et al. |

OTHER PUBLICATIONS

Ung Suok Kim, "Mitigation of Signal Biases Introduced by Controlled Reception Pattern Antennas in a High Integrity Carrier Phase Differential GPS System", PhD dissertation, Stanford Univ., published Mar. 2007, 150 total pages.

Office Action for U.S. Appl. No. 12/548,381, filed Aug. 26, 2009, Office Action dated Dec. 22, 2010 (15 pgs.).

Mader; "GPS Antenna Calibration at the National Geodetic Survey," Silver Spring, MD; date unknown; 15 pages.

Internet: GPS Antenna Calibration, "Calibrated Antennas:"; http://www.ngs.noaa.gov/ANTCAL/; Jun. 11, 2009; 1 page.

* cited by examiner

FIG. 1 (CRPA)

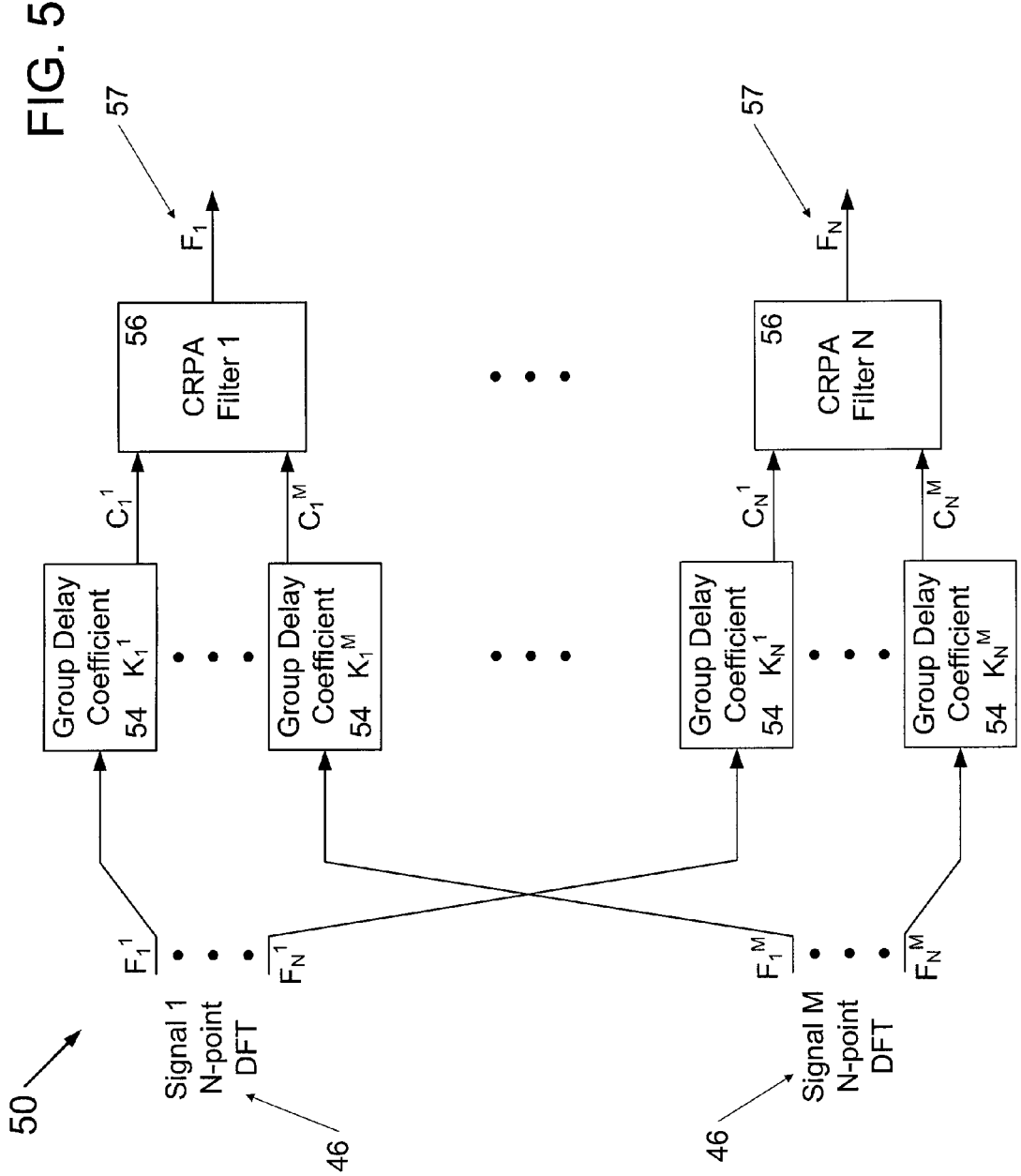

SYSTEM AND METHOD FOR FREQUENCY DOMAIN CORRECTION OF GLOBAL NAVIGATION SATELLITE SYSTEM PSEUDORANCE MEASUREMENTS IN RECEIVERS HAVING CONTROLLED RECEPTION PATTERN ANTENNAS

STATEMENT REGARDING FEDERALLY SPONSORED RESEARCH OR DEVELOPMENT

This invention was made with government support under Contract No. N00019-02-C-3002 awarded by the Department of the Navy. The government has certain rights to this invention.

BACKGROUND OF THE INVENTION

1. Field of the Invention

The present invention relates to the field of Global Navigation Satellite Systems (GNSS), such as the Global Positioning System (GPS), and, more particularly, to range measurement corrections in such systems.

2. Description of the Related Art

Global Navigation Satellite Systems (GNSS) use a constellation of dispersed satellites with atomic clocks orbiting the Earth that transmit predictable signals at exact times. The modulation used by these signals and the data messages included enable the receivers to determine highly accurate navigational locations anywhere on the Earth. The receiver calculates its position by carefully measuring the time of arrival of the signals sent by several of the satellites. Each satellite continually transmits messages containing the time the message was sent, precise orbital information, and the general system health and approximate orbits of all the satellites. By calculating the difference between the broadcast "transmit time" and the received "time of arrival," a time of propagation can be determined and transformed into a range using the speed of propagation "c".

GNSS is considered a dual-use technology, namely, a technology that has significant civilian and military applications. Accordingly, for an example GNSS like the Global Positioning System (GPS), the satellites broadcast on precisely defined carrier frequencies with well-defined modulation. The GPS data and timing signals intended for everyone's use have a publicly-defined format contained in Interface Specification IS-GPS-200, available at http://www.navcen.uscg.gov/gps/geninfo/IS-GPS-200D.pdf, and are unencrypted, while those timing signals intended for military use are not publicly defined and are encrypted and the military specific information content is also encrypted. The satellite employs a pseudorandom code, which is used to modulate the carrier frequency in order to transmit the precise time marks. The carrier frequencies are over 1 GHz, while the code rates are considerably lower. GPS chip rates are roughly 10 MHz for the military code and 1 MHz for the civilian code. Additionally, data messages containing satellite orbit, system health, and other necessary information are transmitted at even a lower rate of 50 bits per second.

Most conventional civilian navigational systems receive a GNSS signal through a single element fixed reception pattern antenna (FRPA) coupled to the receiver. Many military systems, however, use a multiple element controlled reception pattern antenna (CRPA) system to receive a GNSS signal. CRPA systems are much more resistant to the effects of intentional jamming of the GNSS frequencies than are FRPA systems and the signals from each of the elements can be coherently added to increase the carrier-to-noise-density ratio (C/NO) over that of a conventional FRPA type antenna for each received signal.

With GNSS, the receiver measures the transit time, using the precise time marks provided by the pseudorandom code, from a satellite and computes the distance to that satellite by multiplying the transit time by the speed of light. These distance computations are called "pseudoranges" since there is usually a time difference between the atomic satellite clocks used to create the precise time marks and the receiver clocks used to decode the precise time marks. This clock error is common to all measurements since the atomic satellite clocks are all synchronized, and results in a common range error. This common range error is what forms what is often called a "pseudorange" from an absolute range. Other effects that give rise to range errors include atmospheric, multipath, and receiver and antenna hardware.

Geometric multilateration is used to pinpoint the receiver's location by combining these pseudoranges with the corresponding locations of the satellites, using the data from at least four different satellites. Four pseudoranges also allow determination of the clock bias associated with the common range error described above, which adds a fourth dimension of uncertainty, when trying to solve for the other three dimensions of a physical location. Nonetheless, other effects that contribute to range measurement errors remain. Identifying and attempting to account for the multiple sources of errors is an important step to improving the accuracy of locations determined through GNSS.

Atmospheric (i.e., tropospheric and ionospheric) delays are usually the next most significant source of error. The Earth's atmosphere slows down the speed of the satellite transmissions. These errors can be compensated for in a number of ways. For instance, using satellites that are more directly overhead helps because their transmissions travel through less atmosphere than when using satellites closer to the horizon. In addition, having the satellites transmit on multiple frequencies helps mitigate the ionospheric induced error since it is frequency-dependent, so can be mitigated by combining the measurements from the two frequencies into a single ionospheric free measurement. Finally, relative positioning systems, such as Differential GPS, use strategically placed monitor stations at exact locations to determine at any given time what the overall transmission delay (including effects like atmospheric) is for each satellite. These monitor stations then broadcast these delays to all nearby receivers, which then can make the corrections to each of the corresponding satellites.

There are still other effects, most notably receiver antenna hardware, which cannot be compensated through any of the above techniques. To the extent that such effects, such as directionally dependent group delay errors, are not common between different satellites (common errors disappear as part of the clock bias correction calculated when determining location), they can affect the accuracy of the resulting positional calculation. Multiple element receiver antennas add complexity to the mitigation of these non-common errors, because the directionally dependent group delay errors may differ between antenna elements. Each hardware path contributes a different delay to the overall measured time of reception. Accounting for these more complex differences helps systems using multiple element antennas achieve the same accuracy that single element antennas are capable of achieving.

Because the satellite signals are relatively weak, it is straightforward to intentionally jam such signals, either by increasing the noise floor by transmitting broadband noise or by attempting to exceed the dynamic range of the receiver hardware with powerful narrowband signals. Additionally, since the satellite signal structure is so precisely defined and predictable, it can be spoofed by a transmission using the same frequencies and signal structure. This is unacceptable for military applications, so they rely on encrypted signals to thwart any spoofed transmissions, but are still susceptible to intentional interference on the same frequencies. Consequently, for military applications, there is a need to reduce the effect of jamming, so the CRPA system is sometimes used in place of the FRPA system.

Intentional interference is usually significantly stronger than actual satellite transmissions. CRPA systems can use techniques such as nulling (combining the signals received by the CRPA's elements in such a way as to make the jamming signal cancel itself out) or beam steering (combining the signals received by the CRPA's elements in such a way as to amplify the satellite signal) to overcome intentional jamming. Note that beam steering does not physically direct the antenna hardware. Instead, it uses phased array techniques to compensate for the phase of arrival difference caused by the different path length to each element from any satellite to make the signals from each antenna element phase coherent so they add together in amplitude. Also, note that it is possible to perform nulling and beam steering at the same time.

For high quality GNSS pseudorange measurements, non-common receiver hardware induced errors and directionally dependent antenna induced errors must be compensated for to obtain desired accuracies for high precision GNSS requirements in certain applications. The problem of non-common receiver hardware induced errors is a significant issue in sensors that receive the Russian Global Navigation Satellite System (GLONASS), and may be mitigated by using an internally generated calibration signal to measure and eliminate receiver induced errors from the pseudorange measurements, as disclosed by Lennen (U.S. Pat. Nos. 5,949,372 and 6,266,007).

The problem of directionally dependent antenna induced errors is straightforward to solve in FRPA GNSS sensors by subtracting the directionally dependent antenna errors from the pseudorange measurements, in a similar manner to the standard method of correcting GNSS carrier phase measurements for FRPA antenna induced errors that have existed for some years. See, for example, Gerald L. Mader, GPS Antenna Calibration at the National Geodetic Survey, available at http://www.ngs.noaa.gov/ANTCAL/images/summary.html, the entire content of which is herein incorporated by reference. However, for the complex case of a GNSS receiver employing a CRPA and dynamic beam steering, the multiplicity of combinations of antenna element outputs makes compensation of directionally dependent antenna induced errors more difficult, as the simple subtraction that might be used for FRPA compensation does not work with a CRPA. Compensation of pseudorange measurements for such errors is a problem not addressed in previous GNSS CRPA beam steering sensors.

Therefore, with the conversion from the FRPA based systems to CRPA systems for GNSS applications, there is a need to better compensate for the effects of antenna element errors on pseudorange measurement errors.

In U.S. patent application Ser. No. 12/548,387, entitled "System and Method for Correcting Global Navigation Satellite System Pseudorange Measurements in Receivers Having Controlled Reception Pattern Antennas," filed Aug. 26, 2009, the entire content of which is incorporated herein by reference, this problem was addressed by computing the bias that known group delays add to a pseudorange measurement and then subtracting it from the measurement. In a related application, U.S. patent application Ser. No. 12/548,381, entitled "System and Method for Correcting Global Navigation Satellite System Carrier Phase Measurements in Receivers Having Controlled Reception Pattern Antennas," filed Aug. 26, 2009, the entire content of which is incorporated herein by reference, a similar problem, namely correcting for carrier phase inaccuracies in similar CRPA systems, was addressed.

SUMMARY OF THE INVENTION

In accordance with the present invention, a generalized frequency-domain pseudorange correction is provided. This correction is able to compensate a multiple element (channel) GNSS CRPA sensor for channel dependent errors such as group delay and wave propagation differences. The correction applies to both the case of uniform beamforming weights for all frequencies and the more complex case of frequency-dependent weights. Unlike U.S. patent application Ser. No. 12/548,387 (mentioned above), embodiments of the present invention address the problem by removing the group delays from the GNSS signal and thus prevent them from biasing the measurement in the first place. The technique is easier to implement and more general than that method.

According to an exemplary embodiment of the present invention, an apparatus for calibrating a global navigation satellite system (GNSS) receiver system for group delay errors in GNSS transmitter signals is provided. The apparatus includes a controlled reception pattern antenna (CRPA), a signal conditioner, and a processor. The CRPA includes a plurality of receiving elements. The CRPA is configured to sense a plurality of signals from a plurality of GNSS transmitters using one or more transmitter frequencies. The signal conditioner is configured to convert a plurality of sensed GNSS signals to a plurality of time domain digital signals. The processor is configured to convert the time domain digital signals into a plurality of frequency domain digital signals; access group delay calibration correction data for combinations of the plurality of receiving elements, a plurality of transmitter orientations with respect to the CRPA, and the one or more transmitter frequencies; compensate the frequency domain digital signals by the group delay calibration correction data to obtain a plurality of compensated frequency domain digital signals; combine the compensated frequency domain digital signals by GNSS transmitter and frequency to obtain a plurality of frequency domain filtered signals; convert the frequency domain filtered signals into a plurality of time domain filtered signals; and track code modulations of the time domain filtered signals and convert the time domain filtered signals into GNSS pseudorange measurements for the plurality of GNSS transmitters at the one or more transmitter frequencies.

The processor may be further configured to track the code modulations of the time domain filtered signals and convert the time domain filtered signals into pseudorange measurements by using a plurality of delay-locked loops.

The processor may be further configured to determine the transmitter orientation with respect to the CRPA for each of the plurality of GNSS transmitters by obtaining a directional angle from the CRPA to each of the plurality of GNSS transmitters, obtaining an attitude of the CRPA, and combining the directional angle from the CRPA and the attitude of the CRPA for each of the plurality of GNSS transmitters.

The GNSS may use two or more transmitter frequencies, and the group delay calibration correction data may be further organized by the two or more transmitter frequencies.

The apparatus may be configured to perform in real time. The GNSS may be the Global Positioning System (GPS). The CRPA may have seven elements.

The apparatus may be mounted on a dynamic platform.

The apparatus may be mounted on an aircraft, ship, or land vehicle. The apparatus may determine the pseudorange measurements accounting for the variable attitude of the dynamic platform.

According to another exemplary embodiment of the present invention, a method for calibrating a global navigation satellite system (GNSS) receiver system for group delay errors in GNSS transmitter signals is provided. The method includes sensing a plurality of signals from a plurality of GNSS transmitters with a controlled reception pattern antenna (CRPA) having a plurality of receiving elements using one or more transmitter frequencies; converting the sensed GNSS signals to a plurality of time domain digital signals; converting the time domain digital signals into a plurality of frequency domain digital signals; accessing group delay calibration correction data for combinations of the plurality of receiving elements, a plurality of transmitter orientations with respect to the CRPA, and the one or more transmitter frequencies; compensating the frequency domain digital signals by the group delay calibration correction data to obtain a plurality of compensated frequency domain digital signals; combining the compensated frequency domain digital signals by GNSS transmitter and frequency to obtain a plurality of frequency domain filtered signals; converting the frequency domain filtered signals into a plurality of time domain filtered signals; and tracking code modulations of the time domain filtered signals and converting the time domain filtered signals into GNSS pseudorange measurements for the plurality of GNSS transmitters at the one or more transmitter frequencies.

The method may further include determining the transmitter orientation with respect to the CRPA for each of the plurality of GNSS transmitters. Determining the transmitter orientation may include obtaining a directional angle from the CRPA to each of the plurality of GNSS transmitters, obtaining an attitude of the CRPA, and combining the directional angle from the CRPA and the attitude of the CRPA for each of the plurality of GNSS transmitters. The tracking of the code modulations of the time domain filtered signals and converting the filtered signals into pseudorange measurements may include using a plurality of delay-locked loops.

BRIEF DESCRIPTION OF THE DRAWINGS

The accompanying drawings illustrate embodiments of the present invention, and together with the description, serve to explain the principles of the embodiments of the present invention.

FIG. 5 illustrates an example frequency-domain processor from FIG. 4.

DETAILED DESCRIPTION

Embodiments of this invention reduce pseudorange errors through frequency domain compensation of the group delay components that are inherent in the receiver hardware. The illustrative embodiments that follow are only exemplary applications of the present invention and not intended to limit the scope of the invention.

In accordance with the present invention, a generalized frequency-domain pseudorange correction is provided. This correction is able to compensate a multiple element (channel) GNSS CRPA sensor for channel dependent errors such as group delay and wave propagation differences. These group delays can come from sources such as separation of the individual CRPA elements, the signal's direction of arrival, and mismatches between the CRPA's RF channels.

Exemplary embodiments provide pseudorange group delay compensation, in real-time within the receiver digital signal processing, by delaying the digital samples of the GNSS signal in the frequency domain, where the limitation associated with time-based sampling resolution—for example, 8 nanosecond (ns) sampling resolution—does not apply. More specifically, in these embodiments, each Fourier coefficient is multiplied by $e^{jKn}$, where K is a constant and n is the frequency bin number (e.g., 0 to 127 when there are 128 frequency bins in the frequency domain representation). This applies a phase advance to the input that increases linearly with frequency, which produces a negative group delay. When the phase-shifted coefficients are transformed back to the time domain, the resulting signal is advanced in time by K/df, where df=244 kHz is the frequency bin size in this case. K is chosen for each CRPA channel based on the channel's measured group delay. For example, if a channel has a 1 ns group delay, K would be set for that channel to 1 ns×244 kHz=488π microradians.

An exemplary embodiment of the invention includes a GNSS receiver system on a dynamic platform, such as an aircraft, the aircraft and system capable of operating in any direction and orientation. The GNSS broadcasts carrier waves on one or more frequencies. For example, military GPS uses two carrier frequencies, L1=1.57542 GHz and L2=1.2276 GHz, and a third GPS frequency is being added, L5=1.17645 GHz. The GNSS receiver system in the present embodiment uses a receiver connected to a seven-element CRPA along with a carrier-phase correction scheme. Note that although a CRPA has multiple elements, the actual number of elements in the CRPA can vary from seven. A CRPA with fewer elements is simpler and cheaper to build and manage, while a CRPA with more elements provides better intentional jamming protection. Note also that the CRPA may not necessarily be aligned along the centerline of the aircraft.

Figure 1:
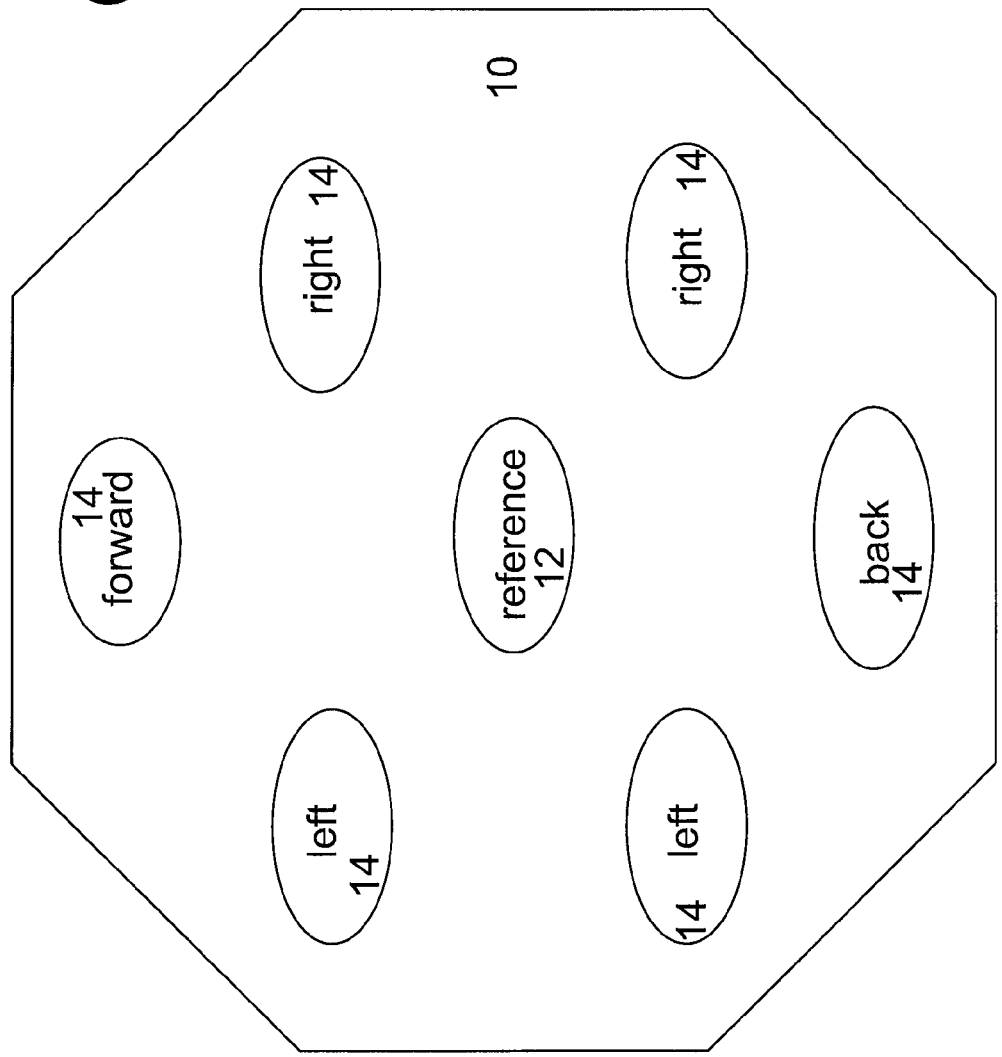
FIG. 1 depicts an example CRPA layout according to one embodiment.

FIG. 1 shows an exemplary CRPA 10 including seven antenna elements (channels). The seven elements break down into one reference element 12 and six auxiliary elements 14, where the reference element 12 is the element most centered with respect to the seven elements while the six auxiliary elements 14 surround the reference element 12 in a symmetrical (hexagonal) layout: one forward, one back, two on the left, and two on the right. Nearby elements are approximately 0.1 m apart. Note that a CRPA may include other numbers of elements, and the elements may differ in size or relative orientation, which may be either symmetric or asymmetric.

Correction Process

Figure 2:
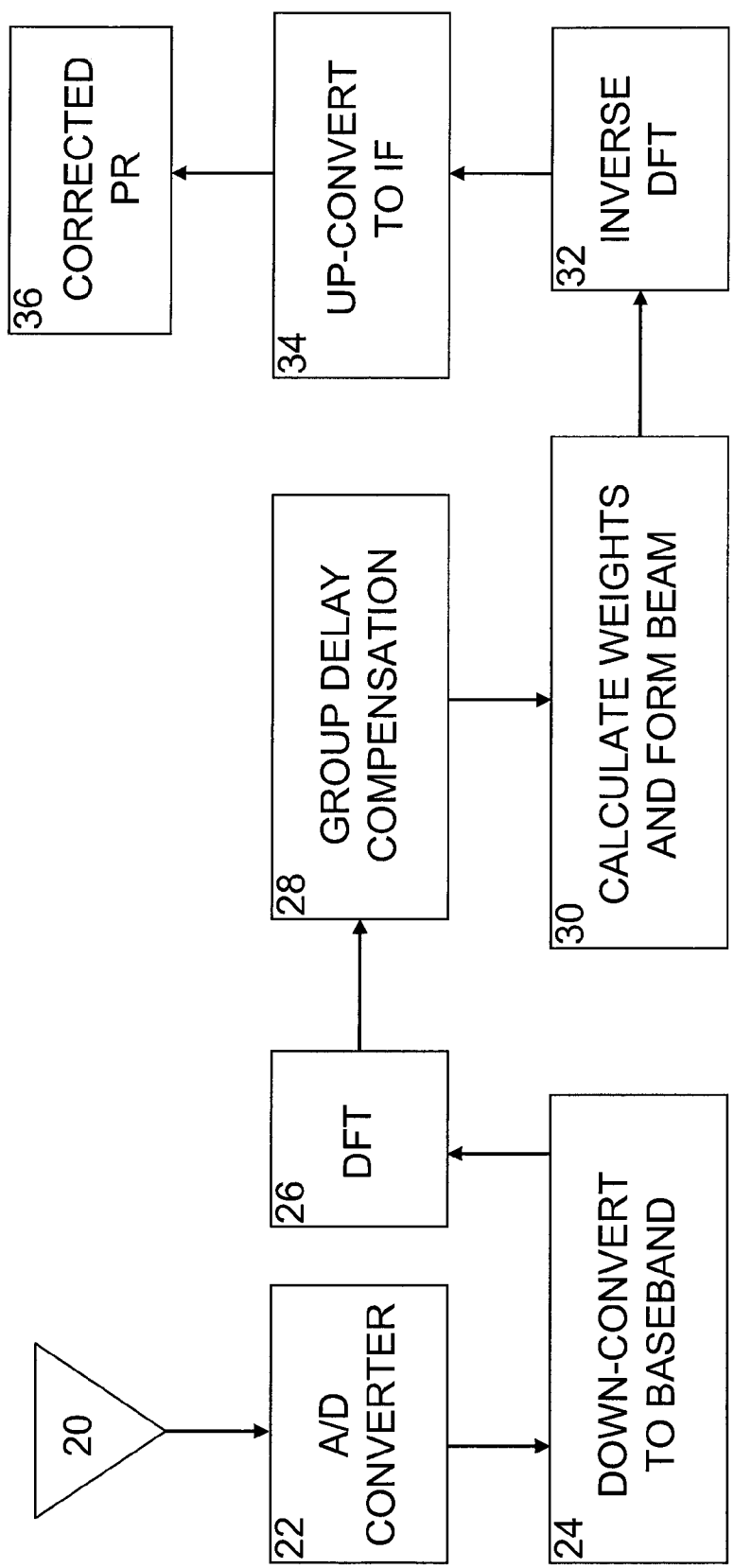
FIG. 2 depicts an overview of a GNSS CRPA frequency-domain pseudorange correction process according to an exemplary embodiment.

FIG. 2 depicts an overview of a frequency-domain pseudorange correction process according to an exemplary embodiment, using a CRPA like the one shown in FIG. 1. Since a phase shift that increases linearly with frequency is equivalent to a negative group delay, the process can exploit this when the GNSS signal is in the frequency domain and before it is sent to the correlators, as shown in FIG. 2.

In FIG. 2, analog satellite signals 20 are first received from GNSS satellites by each of the M individual CRPA elements (in this embodiment, M=7). Each satellite transmits one such signal per frequency (in this embodiment, two such frequencies are used, but this may vary). Each CRPA element (or channel) picks up the analog signal from each satellite. These signals (from each element and for each satellite) are sent to a receiver, which digitally samples the signals in the time domain using analog/digital (A/D) converter 22. The sampled signals are then down-converted 24 to baseband signals. Next, the baseband signals undergo discrete Fourier transform (DFT) 26 to convert them to the frequency domain, that is, into some number N of frequency bins. In the current embodiment, the signals are converted into N=128 separate frequency bins. In each of these conversions 22, 24, 26, the same function is applied to the signals from each of the antenna elements in the CRPA. The signals then undergo frequency-domain group delay compensation 28, described further below.

The remaining portions of FIG. 2 process the signals on a beam-by-beam basis. Each of the GNSS satellites transmits a signal. Because of the different signal encoding used by each satellite, it is straightforward to separate the signals from the different satellites. Nonetheless, for each satellite, there are still as many signals (M) as there are CRPA elements (seven, in this example). In step 30, these seven signals are combined in the frequency domain in each of the N separate frequency bins using a suitable beamforming technique to produce a composite signal for each beam in each of the N separate frequency bins. While forming the beam, weights are calculated to apply to the N different frequency bins. Next, each beam signal is converted back to the time domain by inverse DFT 32. In step 34, each signal is then up-converted to intermediate frequency (IF), which produces the corrected pseudorange (PR) 36 for the CRPA system.

While the signal is in the frequency domain, but before the CRPA filter's weight calculation, the process applies a linear phase shift to the Fourier coefficients (step 28 in FIG. 2). Specifically, if $a_{mn}$ is the coefficient in the $n^{th}$ frequency bin (n=0 to 127) of the $m^{th}$ channel (m=1 to 7), the method replaces $a_{mn}$ by $$a_{mn}' = a_{mn} e^{i2\pi\tau_m nk/NT}, \quad (1)$$

where $\tau_m$ is the $m^{th}$ channel's calibrated group delay, N is the number of DFT frequency bins (128, in this case), and T is the sampling interval (32 ns). For example, if the group delay is 1 ns, the Fourier coefficients are rotated through phase angles of 0 to 11.2°. The bins are numbered such that bin 0 is the signal's DC component.

The reconstructed time-domain signal is related to the Fourier coefficients by the inverse discrete Fourier transform:

$$x_m(kT) = \sum_{n=0}^{N-1} a_{mn} e^{i2\pi nk/N}. \quad (2)$$

Therefore, the method is equivalent to replacing $x_m(kT)$ by $$x_m'(kT) = \sum_{n=0}^{N-1} a_{mn}' e^{i2\pi nk/N} \quad (3)$$

$$= \sum_{n=0}^{N-1} a_{mn} e^{i2\pi\tau_m n/NT} e^{i2\pi nk/N}$$

$$= \sum_{n=0}^{N-1} a_{mn} e^{i2\pi n(k+\tau_m/T)/N}$$

$$= x_m(kT + \tau_m)$$

which shows that the modified signal is advanced in time by $\tau_m$. Therefore, the method eliminates group delay if we set $\tau_m$ in (1) equal to the $m^{th}$ channel's group delay.

Sources of Group Delay

Three of the significant sources of group delay that affect the tracked GNSS signals are the CRPA's size, the antenna elements, and the RF channels. Since the magnitude of these delays depends on the CRPA hardware, the following discussion applies to the CRPA embodiment described above and depicted in FIG. 1.

1. The seven CRPA elements are arranged in a hexagon about a central element with a radius of about 0.1 m, so a satellite signal can arrive at an outer element up to 0.3 ns before or after it arrives at the central element. The CRPA filter manager (discussed below) calculates the signal path length difference between CRPA elements as part of its steering vector computation. A steering vector component has the form $e^{i2\pi u \cdot A_m/\lambda}$, where u is the satellite line of sight (LOS) unit vector and $A_m$ is the $m^{th}$ auxiliary element's displacement from the reference element. The dot product $u \cdot A_m$ is the path length difference and so the group delay is $u \cdot A_m/c$.

2. Studies have shown that a GPS antenna element has a group delay that depends on the signal's direction of arrival and frequency. Variations of about 1 ns have been reported. The CRPA filter manager discussed below can compute 14 antenna group delays per satellite (that is, one for each of the combinations of 7 antenna channels and 2 frequencies) by means of look-up tables in the same way that it can compute 14 antenna phase delays as part of carrier phase correction (see U.S. patent application Ser. No. 12/548,381, discussed above, for more information on this type of correction).

3. Mismatches between the CRPA's RF channels can cause their group delays to differ by up to 2 ns. Since the channels' group delays are measured during calibration and are the same for every satellite (orientation), they can be compensated for with channel-dependent attitude-independent correction values.

Example Method

Figure 3:
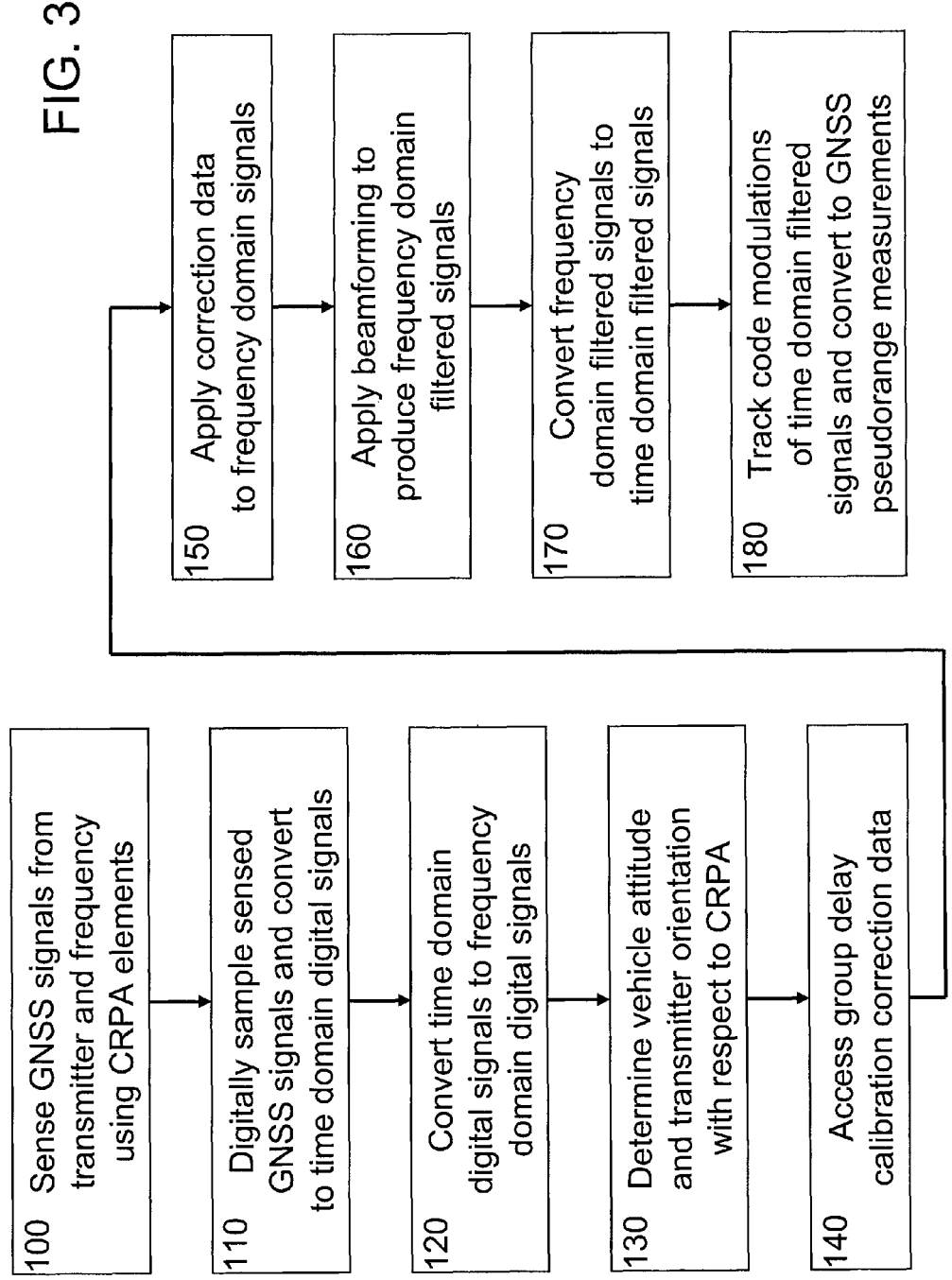
FIG. 3 is an exemplary GNSS CRPA frequency-domain pseudorange correction method.

FIG. 3 shows an example method of correcting a CRPA GNSS frequency-domain pseudorange error from a particular GNSS transmitter for a particular frequency, where the CRPA is mounted in a fixed location on a dynamic platform, such as a moving aircraft or other vehicle. The method starts with step 100, where the CRPA senses GNSS signals for the frequency from the transmitter, whose line of sight (LOS) with respect to the vehicle is already known from earlier signals and positioning calculations. Each CRPA element senses its own GNSS signals. Next, in step 110, the signals are digitally sampled to convert them to digital format in the time domain. This allows the signals to be used in GNSS measurement calculations. In step 120, the digital signals are converted to the frequency domain (for instance, by a discrete Fourier transform (DFT)).

In step 130, an attitude sensor, such as an inertial navigation system (INS), determines the vehicle's attitude, which, when combined with the transmitter's LOS with respect to the vehicle, allows the orientation of the transmitter with respect to the CRPA to be determined. Next, in step 140, group delay calibration correction data—measured empirically during antenna calibration and stored in tables organized by CRPA element and orientation of the transmitter with respect to the CRPA—is accessed to determine the group delay correction for each CRPA element. In step 150, these corrections are applied to each frequency domain signal.

In step 160, beamforming is applied to the frequency domain digital signals (separate sets of signals for each of the CRPA elements) to combine them into a single set of filtered signals (for all of the CRPA elements) in the frequency domain. Then, in step 170, the set of frequency domain filtered signals is converted to a single filtered signal in the time domain (through, for example, an inverse DFT). Finally, in step 180, this signal is used to form a corrected GNSS pseudorange measurement using, for example, a delay-locked loop.

Example System

Figure 4:
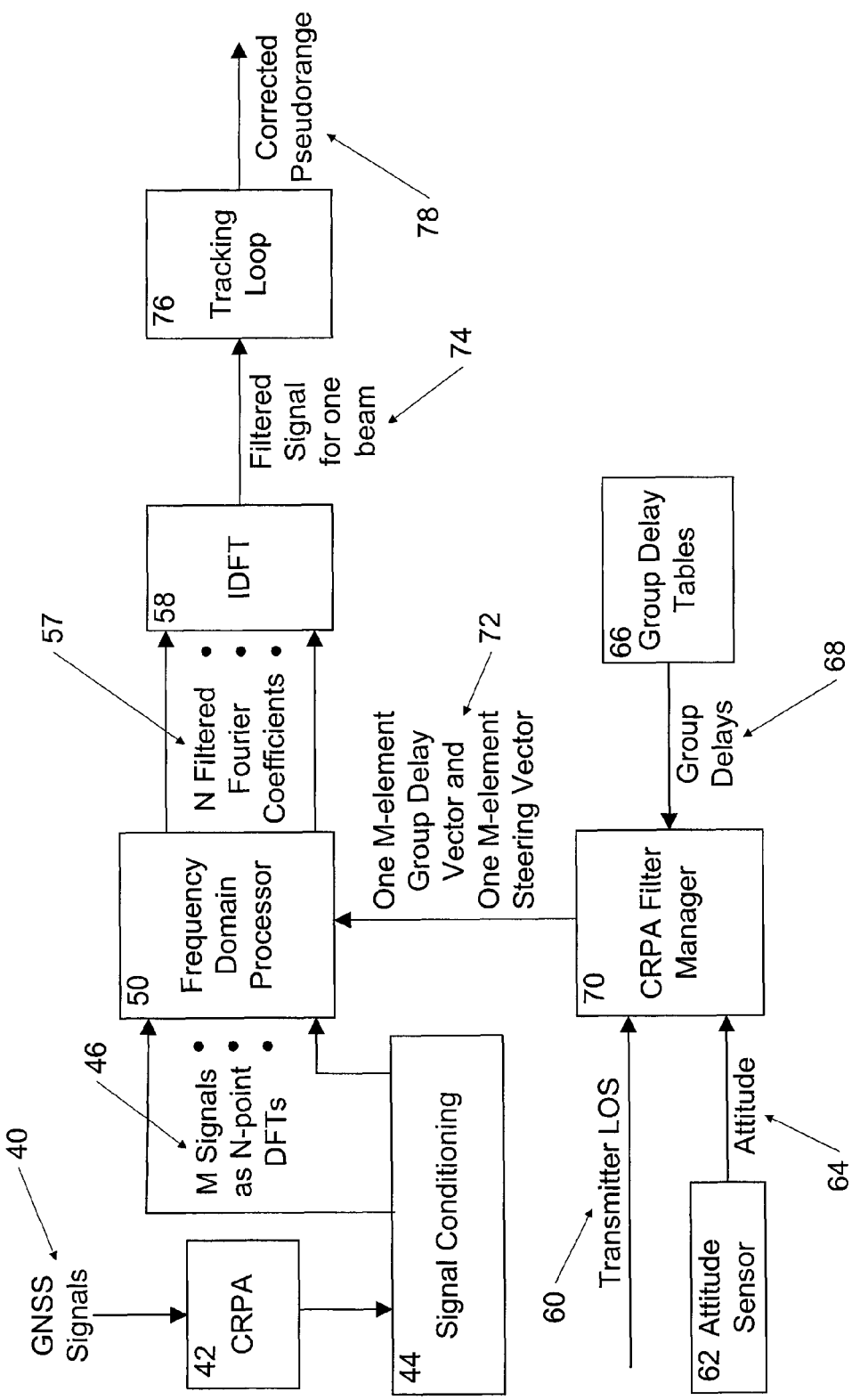
FIG. 4 is a depiction of an exemplary embodiment of a GNSS receiver system for frequency domain correction of pseudorange errors for group delay when the antenna configuration is a CRPA.

FIG. 4 shows an exemplary embodiment of a GNSS receiver system as might be installed on a moving vehicle (for instance, an aircraft) while FIG. 5 shows an example Frequency Domain Processor 50 from FIG. 4. While the description is focused on steering a particular beam, that is, a particular transmission frequency from a particular GNSS satellite, it is understood that any number of frequencies and satellites can be handled concurrently with a similar approach.

More specifically, for each transmitter and frequency of interest, the system uses CRPA 42 to receive a GNSS signal 40 from a particular radio navigation transmitter (satellite). The CRPA 42 includes M antenna elements (M≧2). At any moment in time, each of the M channels is usually receiving and processing a slightly different signal from the satellite because of group delay effects (like the transmitter alignment with respect to the element or effects induced by the internal processing portion of the receiver). The receiver digitally samples the M signals in the time domain and converts the sample signals into M frequency domain N-point vectors using an N-point DFT as part of signal conditioning 44. This divides each such signal into N separate frequency bins. For instance, the $m^{th}$ DFT consists of N complex Fourier coefficients $F_1^m, \ldots, F_N^m$, where $m=1, \ldots, M$. The superscript indicates which antenna element received the signal and the subscript indicates the frequency bin. Thus, there are a total of MN coefficients. The receiver sends these M-element frequency domain vectors 46 (signals 1 to M) to the Frequency Domain Processor 50.

While this is taking place, the system maintains the transmitter's line of sight (LOS) 60 (that is, orientation with respect to the vehicle, or navigation coordinates) as part of tracking the particular satellite of interest. Then, by using attitude sensor 62 (such as an inertial navigation system), the system can determine the attitude 64 of the vehicle (and hence, the CRPA 42). This allows CRPA filter manager 70 to maintain the satellite's orientation with respect to CRPA 42 (that is, antenna coordinates). If the receiver is static, fixed values of attitude 64 may instead be supplied. CRPA filter manager 70 then computes the satellite's azimuth and elevation angles from the transformed LOS vector and uses those angles to look up the group delays 68 in group delay tables 66, one table for each antenna element. The group delay tables 66 contain values measured during antenna calibration, indexed by azimuth and elevation, for each of the transmission frequencies.

M RF channel-dependent group delay values and M free space path length difference group delay values are computed, and combined with the M azimuth and elevation-dependent group delay values computed above to create an M-element total group delay correction vector 72. The CRPA filter manager 70 forwards the M-element group delay correction vector to the Frequency Domain Processor 50.

The Frequency Domain Processor 50, as depicted in FIG. 5, processes the Fourier coefficients $F_1^m, \ldots, F_N^m$, where $m=1, \ldots, M$, provided by the Signal Conditioning 44. The superscript indicates which antenna element received the signal and subscript indicates the frequency bin. Thus, there are a total of MN coefficients. The Fourier coefficients in each of these bins are then compensated for the effects of group delay by multiplying by the complex Group Delay Coefficient 54 based on their corresponding antenna element and the M group delays 72 in a manner as described above (in "Correction process"). This produces MN corrected coefficients $C_n^m$ corresponding to the MN coefficients $F_n^m$.

Frequency Domain Processor 50 then uses N identical filters 56 (corresponding to each of the separate frequency bins) to implement a suitable beamforming technique as is known in the art that combines, for each frequency bin n, the M separate corrected coefficients $C_n^1, \ldots, C_n^M$ into a single filtered coefficient $F_n$ (also labeled 57). Referring to FIG. 4, the inverse DFT 58 takes the N separate filtered coefficients $F_1, \ldots, F_N$ (in the frequency domain) 57 and converts them into a single filtered signal 74 in the time domain. Finally, the filtered signal 74 is sent to tracking loop 76—a delay-locked loop (DLL)—that tracks the signal's code modulation and forms a corrected pseudorange measurement 78.

The foregoing description has provided by way of exemplary and non-limiting examples a full and informative description of the exemplary embodiments of this invention. However, various modifications and adaptations may become apparent to those skilled in the relevant art in view of the foregoing description, when read in conjunction with the accompanying drawings and the appended claims. Nonetheless, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus for calibrating a global navigation satellite system (GNSS) receiver system for group delay errors in GNSS transmitter signals, the apparatus comprising:
   a controlled reception pattern antenna (CRPA) comprising a plurality of receiving elements and configured to sense a plurality of signals from a plurality of GNSS transmitters using one or more transmitter frequencies;
   a signal conditioner configured to convert a plurality of sensed GNSS signals to a plurality of time domain digital signals; and
   a processor configured to:
      convert the time domain digital signals into a plurality of frequency domain digital signals;
      access group delay calibration correction data for combinations of the plurality of receiving elements, a plurality of transmitter orientations with respect to the CRPA, and the one or more transmitter frequencies;
      compensate the frequency domain digital signals by the group delay calibration correction data to obtain a plurality of compensated frequency domain digital signals;
      combine the compensated frequency domain digital signals by GNSS transmitter and frequency to obtain a plurality of frequency domain filtered signals;

convert the frequency domain filtered signals into a plurality of time domain filtered signals; and track code modulations of the time domain filtered signals and convert the time domain filtered signals into GNSS pseudorange measurements for the plurality of GNSS transmitters at the one or more transmitter frequencies.

2. The apparatus of claim 1, wherein the processor is further configured to track the code modulations of the time domain filtered signals and convert the time domain filtered signals into pseudorange measurements by using a plurality of delay-locked loops.

3. The apparatus of claim 1, wherein the processor is further configured to determine the transmitter orientation with respect to the CRPA for each of the plurality of GNSS transmitters by obtaining a directional angle from the CRPA to each of the plurality of GNSS transmitters, obtaining an attitude of the CRPA, and combining the directional angle from the CRPA and the attitude of the CRPA for each of the plurality of GNSS transmitters.

4. The apparatus of claim 1, wherein the GNSS uses two or more transmitter frequencies and the group delay calibration correction data is further organized by the two or more transmitter frequencies.

5. The apparatus of claim 1, wherein the apparatus is configured to perform in real time.

6. The apparatus of claim 1, wherein the GNSS is Global Positioning System (GPS).

7. The apparatus of claim 1, wherein the CRPA has seven elements.

8. The apparatus of claim 5, wherein the apparatus is mounted on a dynamic platform.

9. The apparatus of claim 8, wherein the apparatus is mounted on an aircraft, ship, or land vehicle and wherein the apparatus determines the pseudorange measurements accounting for the variable attitude of the dynamic platform.

10. A method for calibrating a global navigation satellite system (GNSS) receiver system for group delay errors in GNSS transmitter signals, the method comprising:

sensing a plurality of signals from a plurality of GNSS transmitters with a controlled reception pattern antenna (CRPA) comprising a plurality of receiving elements using one or more transmitter frequencies;

converting the sensed GNSS signals to a plurality of time domain digital signals;

converting the time domain digital signals into a plurality of frequency domain digital signals;

accessing group delay calibration correction data for combinations of the plurality of receiving elements, a plurality of transmitter orientations with respect to the CRPA, and the one or more transmitter frequencies;

compensating the frequency domain digital signals by the group delay calibration correction data to obtain a plurality of compensated frequency domain digital signals;

combining the compensated frequency domain digital signals by GNSS transmitter and frequency to obtain a plurality of frequency domain filtered signals;

converting the frequency domain filtered signals into a plurality of time domain filtered signals; and tracking code modulations of the time domain filtered signals and converting the time domain filtered signals into GNSS pseudorange measurements for the plurality of GNSS transmitters at the one or more transmitter frequencies.

11. The method of claim 10, further comprising:

determining the transmitter orientation with respect to the CRPA for each of the plurality of GNSS transmitters, comprising:

obtaining a directional angle from the CRPA to each of the plurality of GNSS transmitters;

obtaining an attitude of the CRPA; and combining the directional angle from the CRPA and the attitude of the CRPA for each of the plurality of GNSS transmitters, wherein the tracking the code modulations of the time domain filtered signals and converting the filtered signals into pseudorange measurements comprises using a plurality of delay-locked loops.

* * * * *